US011561391B2

(12) United States Patent
Zhuang et al.

(10) Patent No.: US 11,561,391 B2
(45) Date of Patent: Jan. 24, 2023

(54) OPTICAL SYSTEM WITH DYNAMIC DISTORTION USING FREEFORM ELEMENTS

(71) Applicant: ImmerVision, Inc., Montreal (CA)

(72) Inventors: Zhenfeng Zhuang, Montreal (CA); Jocelyn Parent, Lavaltrie (CA); Patrice Roulet, Montreal (CA); Simon Thibault, Quebec (CA); Xavier Dallaire, Verdun (CA); Pierre Konen, Saint-Bruno (CA); Valentin Bataille, Montreal (CA); Kevin Miao, Brossard (CA); Manuel Magini, Montreal (CA); Marie-Pier Bellemare, Chambly (CA); Viacheslav Natashyn, Chateauguay (CA); Xiaojun Du, Montreal (CA); Shirley Chan, Candiac (CA); Marcia Griffith, LaSalle (CA); Sophie Gigliotti, Montreal (CA); Ebrahim Mortazy, Verdun (CA)

(73) Assignee: IMMERVISION, INC., Montreal (CA)

( * ) Notice: Subject to any disclaimer, the term of this patent is extended or adjusted under 35 U.S.C. 154(b) by 0 days.

(21) Appl. No.: 17/390,062

(22) Filed: Jul. 30, 2021

(65) Prior Publication Data

US 2022/0035153 A1 Feb. 3, 2022

Related U.S. Application Data

(60) Provisional application No. 63/059,621, filed on Jul. 31, 2020.

(51) Int. Cl.
*G02B 27/00* (2006.01)
*G06T 3/00* (2006.01)
(Continued)

(52) U.S. Cl.
CPC ........... *G02B 27/0068* (2013.01); *G03B 5/04* (2013.01); *G06T 3/0093* (2013.01); *H04N 5/2254* (2013.01); *H04N 5/23229* (2013.01)

(58) Field of Classification Search
CPC .... G02B 27/0068; G02B 3/06; G02B 13/005; G02B 15/04; G02B 26/00; G03B 5/04;
(Continued)

(56) References Cited

U.S. PATENT DOCUMENTS

2012/0314065 A1* 12/2012 Parent ................ G02B 27/0025 359/205.1
2017/0236249 A1* 8/2017 Roulet ................ G06F 3/04847 382/275

(Continued)

OTHER PUBLICATIONS

Int'l Search Report and Written Opinion dated Nov. 5, 2021 in Int'l Application No. PCT/IB2021/057012.

*Primary Examiner* — Chiawei Chen
(74) *Attorney, Agent, or Firm* — Panitch Schwarze Belisario & Nadel LLP

(57) ABSTRACT

A method for designing an optical system for providing reliable, robust and successful realization of a distortion variation function is presented. In a preferred embodiment, the proposed distortion variation optical system includes at least two non-symmetrical elements, which are moving in the transverse direction. The proposed freeform lens contains two transmissive refractive surfaces. The freeform elements designed with this method have preferably a flat surface and a non-symmetrical freeform surface. The two plano-surfaces are preferably made to face each other, so that a miniature camera can be offered. The value of the non-symmetrical freeform surface is used to produce variable optical power when the two freeform elements undergo a relative movement in the vertical direction. Using this
(Continued)

method, an optical system with an active distortion, smaller form factor, and better imaging quality can be obtained.

24 Claims, 7 Drawing Sheets

(51) Int. Cl.
*G03B 5/04* (2021.01)
*H04N 5/225* (2006.01)
*H04N 5/232* (2006.01)

(58) Field of Classification Search
CPC ...... G03B 5/00; G06T 3/0093; H04N 5/2254; H04N 5/23229; H04N 5/232; H04N 5/23238; H04N 5/3572; H04N 9/045; H04N 9/09
See application file for complete search history.

(56) References Cited

U.S. PATENT DOCUMENTS

2019/0079261 A1* 3/2019 Wang .................... G02B 7/023
2022/0146799 A1* 5/2022 Otake ................... G02B 13/18

* cited by examiner

OPTICAL SYSTEM WITH DYNAMIC DISTORTION USING FREEFORM ELEMENTS

CROSS-REFERENCE TO RELATED APPLICATIONS

The present application claims the benefit of U.S. Provisional Patent Application No. 63/059,621, filed on Jul. 31, 2021, entitled "Optical system with dynamic distortion using freeform elements," the entire contents of which are incorporated by reference herein.

BACKGROUND OF THE INVENTION

Embodiments of the present invention relate to the field of optical lenses and their design and, more particularly, to an optical architecture of an optical system and associated image processing software having at least one movable freeform optical element that can be laterally shifted for changing refractive power to realize a distortion variation function.

Optical image capturing systems are found in myriad applications from medical diagnostic instruments to entertainment, from scientific utilization to civilian use. In optical image capturing systems, spherical lenses or aspheric lenses are the typical components that are combined with complementary metal oxide semiconductor sensors for offering high performance image quality.

However, most existing optical image capturing systems commonly do not have the dynamic optical angular resolution function which is useful in many different application scenarios. Traditional optical image capturing systems using rotationally symmetric components have limited performance that cannot meet all current technology development demands. Benefiting from increasing manufacturing capabilities for non-symmetrical optical surfaces, optical components with freeform surfaces are now available as an alternative technique for image applications.

There has therefore been a long felt need for an optical image capturing system suitable for many application scenarios with the function of distortion variation in a small form factor.

BRIEF SUMMARY OF THE INVENTION

Embodiments of the present invention present a method to dynamically control optical distortion of an optical system in a small form factor, which is well suited for applications such as smart phones, security cameras, automotive cameras, robotic, drones, IoT and other small-scale imaging systems.

In a preferred embodiment, the use of at least one and often two or more freeform lenses offers the variation of distortion with a lateral movement with respect to the optical axis. Such an optical system offers a compact form factor suitable for using in smart mobile devices, security, automotive or other applications. In some embodiments, a freeform component pair is arranged with one behind the other along the optical axis of the optical system and each freeform element has a flat surface and a non-symmetrical freeform surface. Specifically, in one preferred embodiment, the two plano-surfaces are arranged to face each other to ensure that the freeform pair do not conflict with each other.

In an embodiment, optical distortion variation is continuously provided by the optical system. Movement of one freeform lens relative to the other provides resolution magnification in the central part of the field of view, in the mid-zone and at the edge of the field of view.

BRIEF DESCRIPTION OF THE DRAWINGS

The foregoing summary, as well as the following detailed description of a preferred embodiment of the invention, will be better understood when read in conjunction with the appended drawings. For illustration purposes, the drawings show an embodiment which is presently preferred. It should be understood, however, that the invention is not limited to the precise arrangements and instrumentalities shown.

In the drawings.

DETAILED DESCRIPTION OF THE INVENTION

The words "a" and "an", as used in the claims and in the corresponding portions of the specification, mean "at least one."

Figure 1:
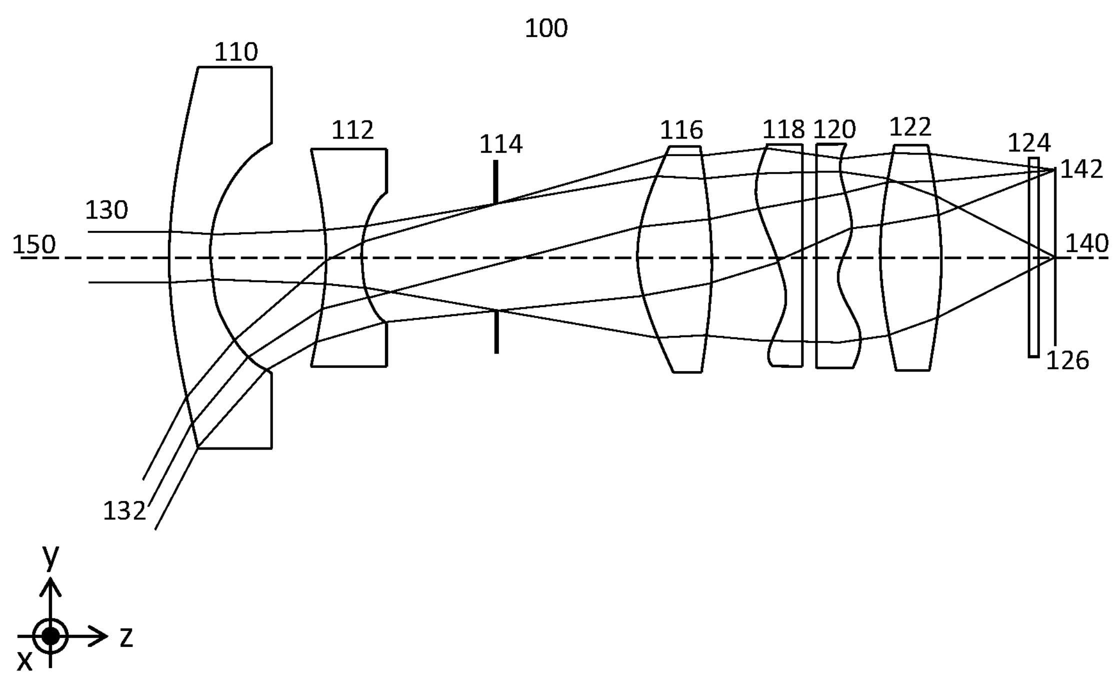
FIG. 1 shows an example optical layout of an optical system comprising a freeform element pair with lateral movement perpendicular to an optical axis to dynamically change the distortion.

FIG. 1 shows an example optical layout 100 of an optical system using two movable freeform elements arranged in tandem to dynamically change the distortion. In this example, the optical system includes a wide-angle lens made of six refractive elements all made of plastics, but the optical system according to the present invention is not limited to any specific number of optical elements, any specific material or any lens shape. For example, in alternative constructions, the optical systems could be made of a plurality of optical elements in any combination of refractive and reflective optical elements and be made of any combination of plastics, glass, crystal or other types of elements. According to the invention, the plurality of optical elements includes at least one movable freeform element. The optical system could also have more or less than six optical elements. The optical systems could also include at least one diffractive optical element, an element with meta-surfaces, a wafer-scale optical element or any other optical element that can be used to help form an optical image in one or more image planes from the object, including active deformable elements like a deformable mirror, liquid lens, liquid crystal lens or the like.

In this example, the wide-angle half field of view, represented by the angle of the bundle of rays 132 relative to the central bundle of rays 130, is 62.5°, representing a full field of view of 125°. However, this value is just an example of a wide-angle field of view, also known as a panoramic field of view, of an optical system designed according to the method of the present invention. In all embodiments, the optical image has a total field of view. In a preferred embodiment, the wide-angle total field of view is larger than 80°. In other embodiments, the wide-angle field of view is larger than 120°. In other embodiments, the total field of view could be of any value, from extremely narrow field of view to extremely wide field of view. For example, in some other embodiments according to the present invention, the total field of view of the optical system could be well under 50°. In another embodiment, the total field of view could be well over 180°.

In FIG. 1, the lens has an object side on the left of the layout and an image side on the right of the layout. In this example layout, from the object side to the image side, the optical system includes a first element 110 being rotationally symmetrical, a second element 112 being rotationally symmetrical, an aperture stop 114, a third element 116 being rotationally symmetrical, a fourth element 118 being of freeform shape, a fifth element 120 being of freeform shape, a sixth element 112 being rotationally symmetrical, a sensor cover glass 124 that can also possibly act as a filter to cut a selected part of the light spectrum and an image plane 126, a plane at which an image sensor is approximately located. According to the method of the present invention, there can be any number of rotationally symmetrical elements and at least one freeform optical element. In a preferred embodiment, there are at least two freeform optical elements. The rotationally symmetrical elements can be of any shape, including spherical or aspherical. They can be rotationally symmetrical around the optical axis 150 or around any other axis. The optical system could also include any number of cemented elements forming doublets or triplets or the like in order to improve the performance of the optical system, including image quality and chromatic aberrations.

In this example, there are two freeform optical elements 118 and 120 that can shift laterally perpendicular to the optical axis 150, illustrated in this example by a translation in the Y direction, to adjust the distortion of the system as further described at FIG. 3 to FIG. 5. In some other embodiments, the number of freeform elements could be only one or more than two, up to the total number of elements. Also, in addition to the moving freeform elements, there could at least one freeform optical element that is fixed. In some embodiments, all of the optical elements could be of freeform shapes, with some fixed and some movable. The position of the freeform elements in the layout 100 is also an example, but these movable freeform elements could be at any position, including at the front of the system, before the aperture stop, after the aperture stop or near the image plane. In the example layout 100, the two movable freeform optical elements 118, 120 are arranged in a tandem configuration, but in other embodiments, there could be at least one optical element located between them. In this example optical construction, the moving direction of the elements 118 and 120 is parallel to the XOZ plane. The freeform elements 118, 120 move in opposite orientation in the Y direction in this example, but the movable freeform elements could move in any direction in order to change the distortion profile of the optical system, including any combination of translations and rotations. In this example, if the element 118 moves in the positive Y direction, the element 120 moves in the negative Y direction and inversely.

The lens in the optical layout 100 has a total track length, represented as the distance from the vertex of the first optical element 110 to the image plane 124. For consumer electronics applications of the lens according to the current invention, the total track length is generally less than 10 mm, but it could be even smaller and be less than 7.5 mm or even less than 5 mm. The small form factor for this optical system with dynamic distortion profile is possible thanks to the freeform elements moving in a transverse direction instead of a longitudinal direction. By moving the freeform elements in a transverse direction, like in the Y direction in this example, instead of the axial Z direction as would be the case for a classical zoom system, the method according to the present invention allows to limit the total track length of the optical system, limiting the total Z-height of corresponding camera modules, which enables use in devices where the height of the camera system is limited, as in a smartphone. In other applications according to the present invention, as in an automotive lens or a security lens, the total track length could be larger than 10 mm.

The bundle of rays from a central field of view 130 form an image at a location 140 in the image plane and the bundle of rays from an edge field of view 132 form an image at a location 142 in the image plane. Not shown on the layout, there are also rays hitting the front surface at every other field angle, forming a continuous sampling of the object between the central field of view 130 and the edge field of view 132, these rays forming a continuous image in the image plane 126. The image in the image plane is not linear with respect to the field angle. The relation between the image height and the object field angle is called the distribution function and is defined in two dimensions because the optical system comprises at least one non-symmetrical freeform element. By taking the mathematical derivative of the image height as a function of the object angle along any desired axis, a resolution curve along this axis can be obtained. The resolution curve is often calculated in pixels/degree when the image height is given in pixels of the image sensor and the field angle in degrees or in μm/degree when the image height is given in μm and the field angle in degrees. The resolution curve shows where the resolution, or the magnification, is minimum and maximum along a designated axis.

Figure 2A:
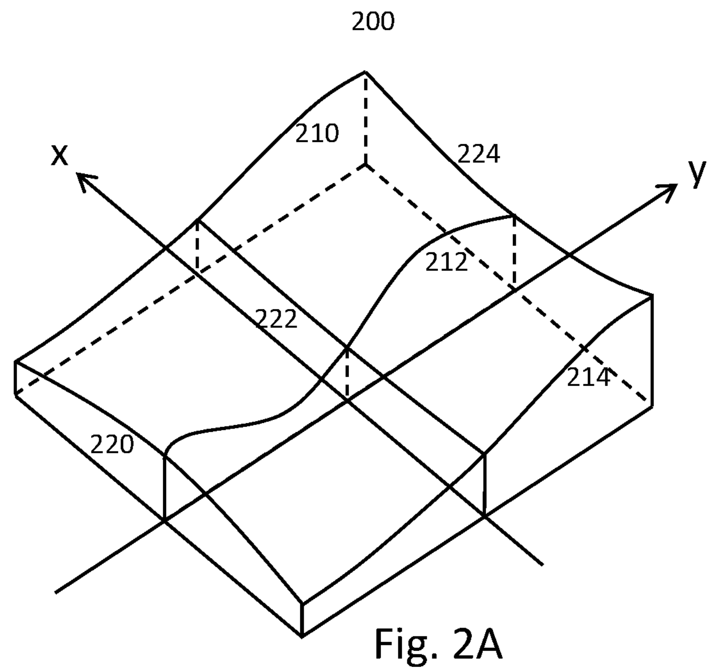
FIGS. 2A and 2B show in perspective view an example of the freeform element pair as described in FIG. 1.
Figure 2B:
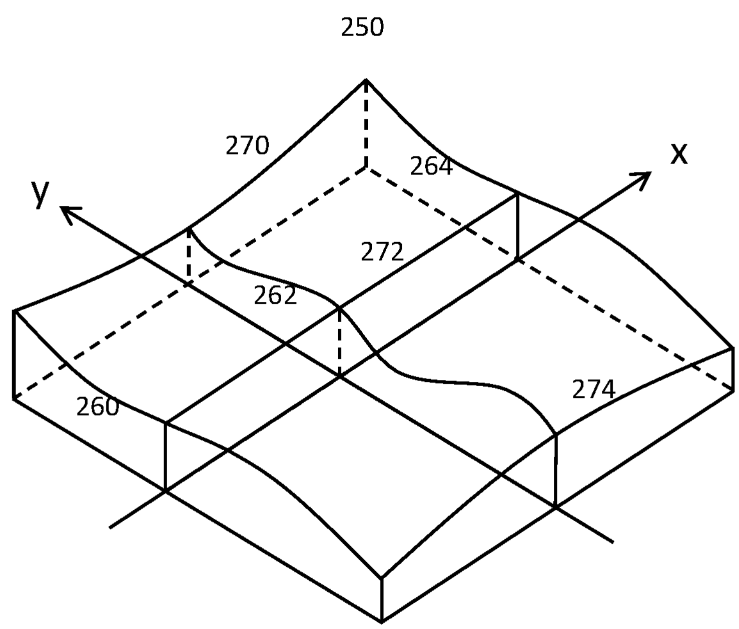

FIG. 2 shows a general indication of the shape of the freeform elements 118 and 120 described in FIG. 1. Again, this representation is only an example showing freeform surfaces that can be moved to control the distortion of a lens to change, in real-time, the distribution function and the resolution curve depending on the required application or the object scene content, but these freeform elements can be of any shape depending on the required distribution function. A freeform element is an optical element with at least one of its surfaces being a freeform surface. In FIG. 2A, the freeform element 200 includes a freeform surface on the object side and a flat surface on the image side of the complete lens while at FIG. 2B, the freeform element 250 includes a flat surface on the object side and a freeform surface on the image side of the complete lens. In this preferred embodiment example, in no way limiting the scope of the current invention, the two flat surfaces are next to each other in part to make sure that the freeform pair do not conflict with each other when translated. An air space between the two optical elements can be of any thickness as required for creating the desired distribution function. In an alternative embodiment, the two flat surfaces could be in contact and moving with opposite lateral translation. In a further alternative embodiment, the freeform surfaces of the elements 118 and 120 can be oriented facing each other and nested with a minimal air gap to form an optical distortion variation. Alternatively, the two freeform surfaces could each face the object side of the lens or the image side of the lens. Also, there is no absolute requirement for a flat surface on a freeform element according to the method of the present invention and the surface on the other side of the freeform surface on a freeform element could also be a freeform surface or any other surface shape.

In this example, since the lenses are designed to be translated along the Y direction, the freeform element 200 has an asymmetrical surface shape about the XOZ plane, as illustrated by the cuts 210, 212 and 214 along the Y direction and a symmetrical shape about the YOZ plane, as illustrated by the cuts 220, 222 and 224 along the X direction. In this example, the cuts in the X directions go from convex at 220 to flat at 222 and concave at 224, but this is just an example according to the method of the present invention. Similarly, the freeform element 250 has an asymmetrical surface shape about the XOZ plane, as illustrated by the cuts 260, 262 and 264 along the Y direction and a symmetrical shape about the YOZ plane as illustrated by the cuts 270, 272 and 274 along the X direction. In this example, the cuts in the X direction go from convex at 274 to flat at 272 and concave at 270, but this is just an example according to the method of the present invention.

Figure 3A:
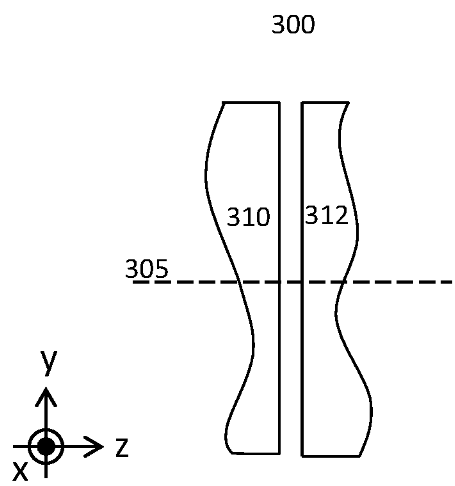
FIG. 3A shows the freeform element pair in a first configuration.
Figure 3B:
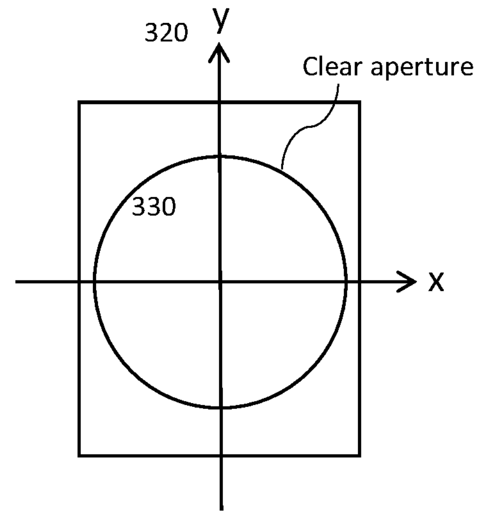
FIG. 3B shows the resulting clear aperture schematic for the freeform element pair in the first configuration.
Figure 3C:
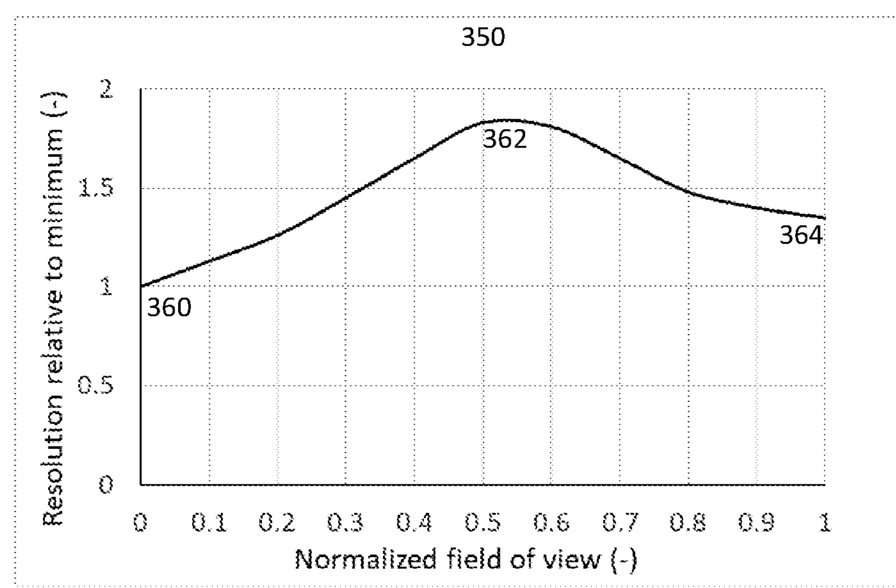
FIG. 3C shows a distortion profile created by the freeform element pair in the first configuration, with a maximum resolution in a mid-zone between the center and the edge of the field of view.

FIG. 3 represents a first example configuration for the two movable freeform elements from the layout of FIG. 1, creating a distortion profile with a maximum resolution in a mid-zone between the center and the edge of the field of view. At FIG. 3A, for the sake of illustration, the simplified optical layout 300 shows only the two freeform elements 310 and 312 from the full layout previously presented at FIG. 1. In this first configuration, there is zero lateral shift between freeform elements 310 and 312 with respect to the optical axis 305. FIG. 3B shows the resulting clear aperture schematic 320 for these two freeform elements in a central position. In this case, the aperture of both elements is centered and the resulting clear aperture 330 is centered and maximum. FIG. 3C then shows the corresponding resolution curve 350 for the full optical system when the elements 310 and 312 are in this first configuration. The resolution curve 350 is the mathematical derivative with respect to the field angle of the distribution function relating the image height from the optical axis with respect to the field of view angle. The resolution curve 350 is normalized in the horizontal axis with respect to the maximum field of view, resulting in a maximum field of view in this example of 1.0. The resolution curve 350 is also normalized in the vertical axis with respect to the minimum resolution, so that the minimum resolution value in this example is 1.0. In this first example configuration, the minimum 360 is located in the center. There is also a maximum of resolution 362 which is located in a mid-zone between the center of the field of view and the edge of the field of view. At the edge of the field of view, the resolution 364 is lower than at the maximum 362 and higher than at the minimum 360. This resulting resolution curve 350 when the freeform elements are in a centered position with respect to the optical axis will be better understood by referring to FIGS. 4 and 5 that show two other configurations for the freeform elements.

Figure 4A:
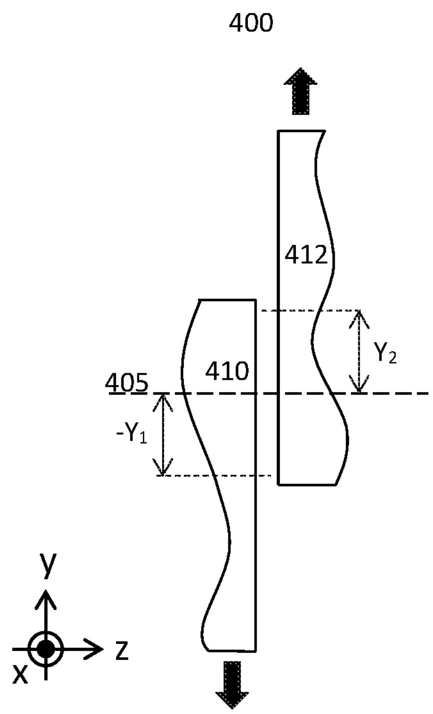
FIG. 4A shows the freeform element pair in a second configuration.
Figure 4B:
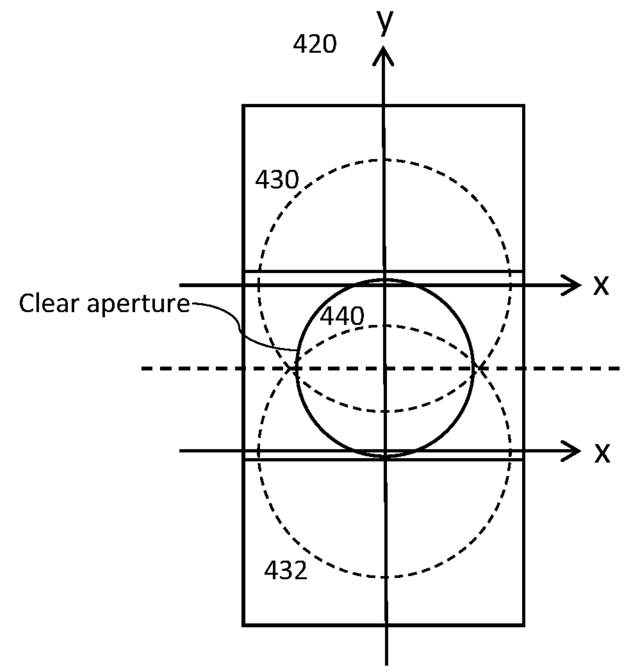
FIG. 4B shows the resulting clear aperture schematic for the freeform element pair in the second configuration.
Figure 4C:
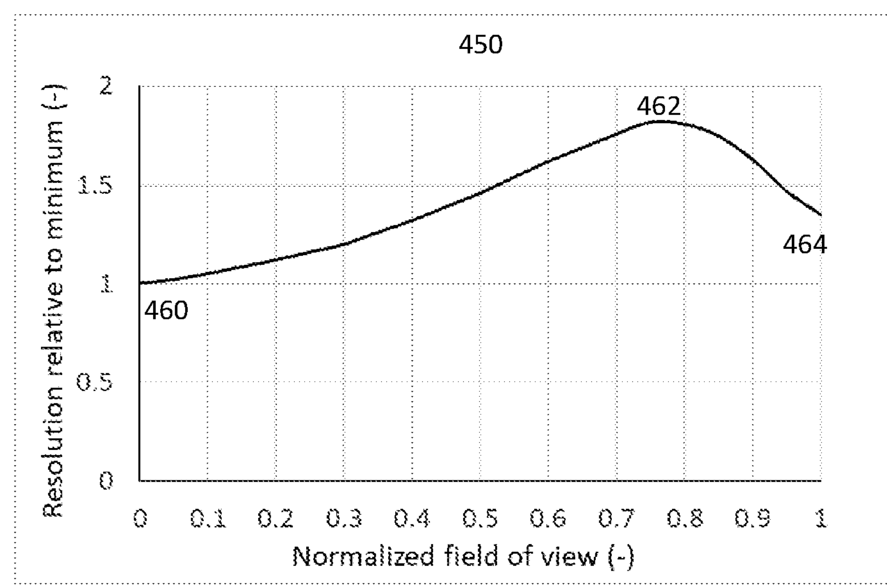
FIG. 4C shows a distortion profile created by the freeform element pair in the second configuration, with a maximum resolution in a zone toward the edge of the field of view.

FIG. 4 describes a second example configuration using the movable freeform elements of FIG. 1, this time for creating a distortion profile with a maximum resolution toward the edge field of view. At FIG. 4A, a simplified optical layout 400 shows only the two freeform elements 410 and 412 from the full layout previously presented at FIG. 1. In this second configuration, the freeform element 410 is translated by a distance Y1 in the negative Y direction with respect to the optical axis 405 and the freeform element 412 is translated by a distance Y2 in the positive Y direction with respect to the optical axis. The absolute value of the distance Y1 and the distance Y2 could be identical or different depending on the shape of the elements. FIG. 4B shows the resulting clear aperture schematic 420 for these two freeform elements in the second configuration. In this case, the aperture 430 of element 412 is decentered in the positive Y direction and the aperture 432 of element 410 is decentered in the negative Y direction. The resulting clear aperture of the system 440 is smaller than the individual apertures 430 or 432. FIG. 4C then shows the corresponding resolution curve 450 for the full optical system when the elements 410 and 412 are in this second configuration. The resolution curve 450 is the mathematical derivative with respect to the field angle of the distribution function relating the image height from the optical axis with respect to the field of view angle. The resolution curve 450 is normalized in the horizontal axis with respect to the maximum field of view, resulting in a maximum field of view in this example of 1.0. The resolution curve 450 is also normalized in the vertical axis with respect to the minimum resolution, so that the minimum resolution value in this example is 1.0. In this second example configuration, the minimum 460 is located in the center. There is also a maximum of resolution 462 which is located closer to the edge of the field of view compared to the maximum 362 from FIG. 3C. The shift of the resolution curve is the result of the light rays hitting the freeform surfaces at different locations compared to the first configuration. At the edge of the field of view, the resolution 464 is lower than at the maximum 462 and higher than at the minimum 460, but in other embodiments, the maximum resolution value could be at the very edge of the field of view.

Figure 5A:
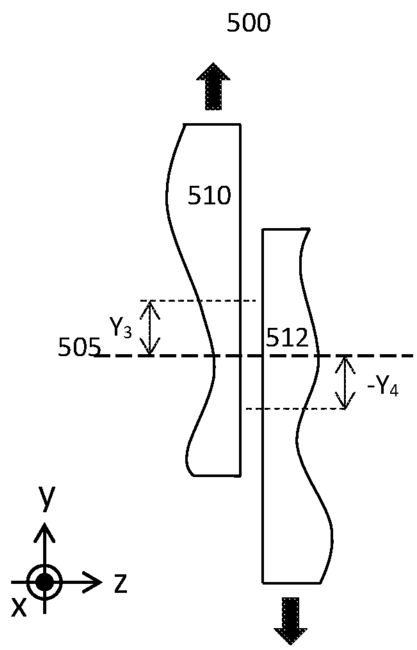
FIG. 5A shows the freeform element pair in a third configuration.
Figure 5B:
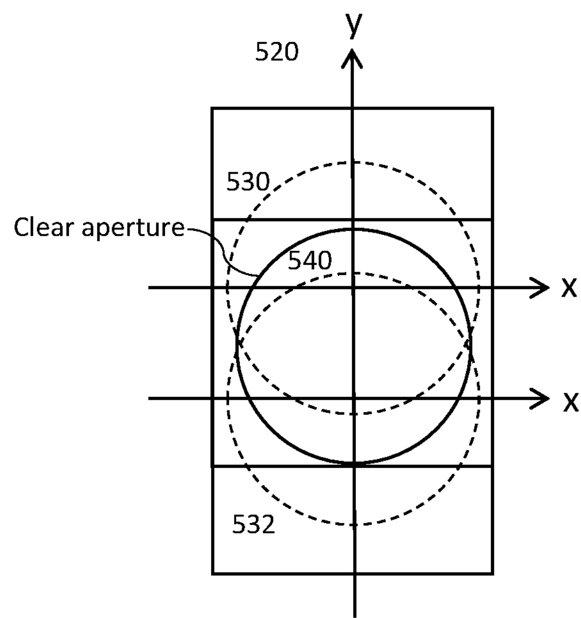
FIG. 5B shows the resulting clear aperture schematic for the freeform element pair in the third configuration.
Figure 5C:
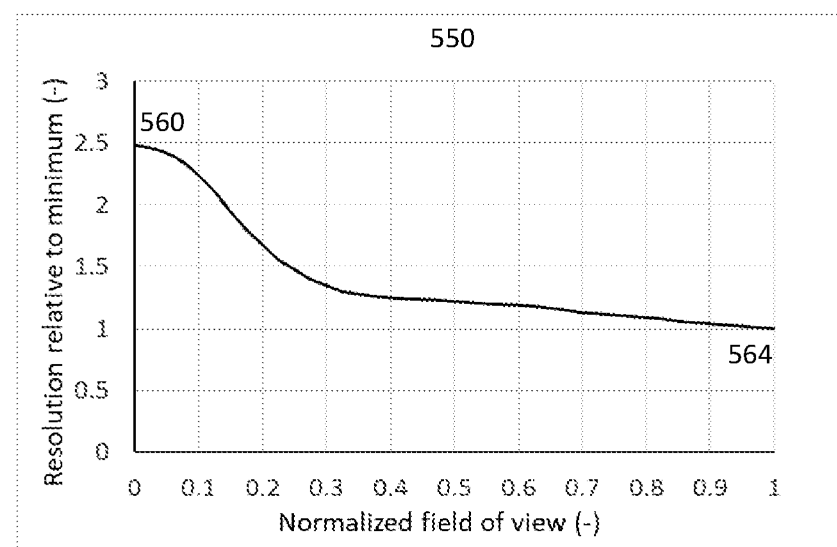
FIG. 5C shows a distortion profile created by the freeform element pair in the third configuration, with a maximum resolution in a zone toward the center of the field of view.

FIG. 5 describes a third example configuration using the movable freeform elements of FIG. 1, this time for creating a distortion profile with a maximum resolution in the center of the field of view. At FIG. 5A, a simplified optical layout 500 shows only the two freeform elements 510 and 512 from the full layout previously presented at FIG. 1. In this third configuration, the freeform element 510 is translated by a distance Y3 in the positive Y direction with respect to the optical axis 505 and the freeform element 512 is translated by a distance Y4 in the negative Y direction with respect to the optical axis. The absolute value of the distance Y3 and the distance Y4 could be identical or different depending on the shape of the elements. FIG. 5B shows the resulting clear aperture schematic 520 for these two freeform elements in the third configuration. In this case, the aperture 530 of element 510 is decentered in the positive Y direction and the aperture 532 of element 512 is decentered in the negative Y direction. The resulting clear aperture of the system 540 is smaller than the individual apertures 530 or 532. FIG. 5C then shows the corresponding resolution curve 550 for the full optical system when the elements 510 and 512 are in this third configuration. The resolution curve 550 is the mathematical derivative with respect to the field angle of the distribution function relating the image height from the optical axis with respect to the field of view angle. The resolution curve 550 is normalized in the horizontal axis with respect to the maximum field of view, resulting in a maximum field of view in this example of 1.0. The resolution curve 550 is also normalized in the vertical axis with respect to the minimum resolution, so that the minimum resolution value in this example is 1.0. In this third example configuration, the minimum 564 is located in the edge of the field of view and the maximum of resolution 560 is located in the center of the field of view. The shift of the resolution curve compared to FIG. 3 and FIG. 4 is the result of the light rays hitting the freeform surfaces at different locations compared to the first or second configurations.

The three example configurations from FIG. 3 to FIG. 5 showed three discrete positions of the freeform elements creating three different resolution curves. In a preferred embodiment, the translation of the freeform elements is continuous and there is a resulting resolution curve for each of the continuous positions, allowing to create a resolution curve with a continuously movable maximum resolution value across the field of view. Alternatively, in some other embodiments, the freeform positions creating an image could be limited to only some discrete positions so that only a pre-determined number of pre-calculated resolution curves could be achieved. In a preferred embodiment, the resolution value, expressed for example in micrometers/degree when the image height is expressed in micrometers and the field angle is expressed in degrees, calculated for at least one field angle in the total field of view, varies by at least ±10% between a first resolution curve and a second resolution curve. The first resolution curve could be the one with the minimum resolution value, when the freeform elements are in a first configuration. The second resolution curve could be the one with the maximum resolution value when the freeform elements are in a second configuration. For example, if an optical system with the freeform elements positioned in a first configuration has a resolution of 30 μm/° at an object field angle for example of 15° from the optical axis and the same optical system with the freeform elements positioned in a second configuration has a resolution of 45 μm/° at the same object field angle of 15°, there is an increase of resolution of +50% using the formula (MaxValue−MinValue)/MinValue. This value of +50% is well above the minimum requirement of ±10% according to the present invention. In other embodiments according to the present invention, the resolution varies by at least ±25% or even at least ±50% between its minimum resolution value when the freeform elements are in a first configuration compared to its maximum resolution value when the freeform elements are in a second configuration.

Figure 6:
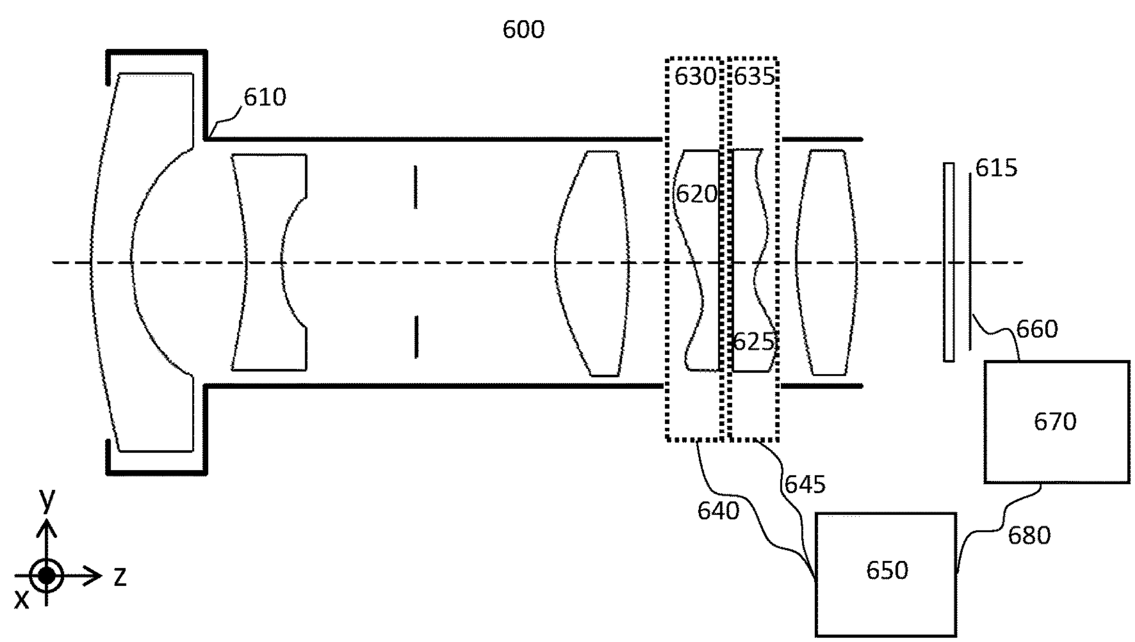
FIG. 6 shows an example embodiment in which actuators controlled by a controller can move the freeform elements.
Figure 7A:
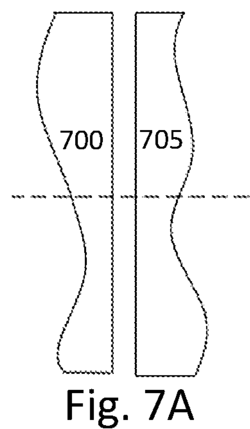
FIGS. 7A-7F show multiple examples of configurations of the at least one freeform element.
Figure 7B:
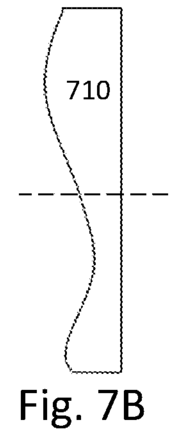
Figure 7C:
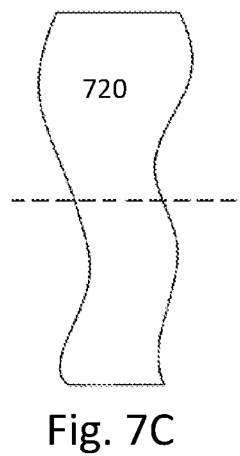
Figure 7D:
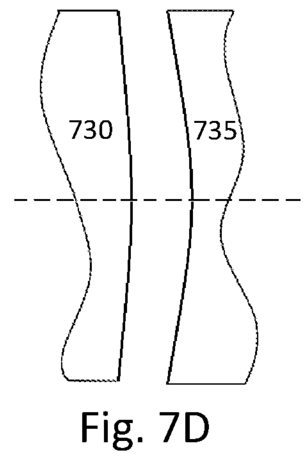
Figure 7E:
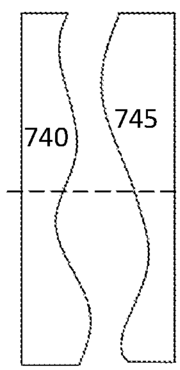
Figure 7F:
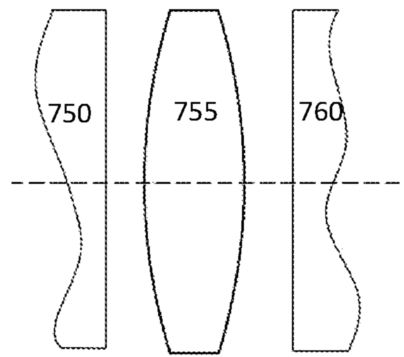

FIG. 6 shows an example embodiment of the optical system to create distorted images having dynamically adapting non-linear resolution curves in which actuators controlled by a controller can move the freeform elements. The full optical and electronic system 600 includes a mechanical casing 610 holding the optical elements shown previously at FIG. 1 together. This mechanical casing can be of any material, including metal or plastics. In all embodiments, there is at least one actuator configured to move the at least one movable freeform element between at least a first position and a second position different from the first position. In the figure, there is an actuator 630 that can move the freeform element 620 in the positive or negative Y direction and an actuator 635 that can move the freeform element 625 in the positive or negative Y direction. The actuators moving the freeform elements can be of any shape or using any technology, including micro-electromechanical systems, voice coil motors, shape memory alloys, linear actuators, rotary actuators, hydraulic actuators, pneumatic actuators, electric actuators, thermal actuators, magnetic actuators, mechanical actuators, or the like. In some embodiments, these actuators can be completely enclosed inside the mechanical casing 610 while in other embodiments, a part of the actuators could extend outside of the mechanical casing 610 via a hole in the Y direction. In some other embodiments, the two freeform elements could be moved together in opposite directions with a single actuator and a mechanism linking the at least 2 freeform elements together. In all embodiments, there is also a controller configured to control the at least one actuator. In the figure, the actuators 630 and 635 are linked to a controller 650 via links 640 and 645. The controller could be any hardware device capable of controlling the position of the freeform elements depending on the resolution curve required, including depending on the particular application of the lens, movement detected in the object, particular objects of interest identified in the image, information from internal or external sensors like a compass, a GPS or an accelerometer, a human user selection (either by conscious direct input or unconscious input as eye-gazing selection), an algorithm automatically analyzing the resulting image and automatically selecting the best resolution curve, or any other way to decide of the best resolution curve at a given time. The controller can be located inside the lens system, inside the camera, or inside the device in which the camera is located, like a smartphone or a computer. Alternatively, the controller could also be part of a separate device and the information about the ideal actuator position can be transmitted via any communication link, including wireless, via the Internet or the like.

When the controller instructs the actuator to move the freeform element, it creates a resolution curve as desired. According to the present invention, when the at least one movable freeform element is in the first position, the optical image created by the plurality of optical elements has a first resolution curve and when the at least one movable freeform element is in the second position, the optical image created by the plurality of optical elements has a second resolution curve, the first resolution curve being different than the second resolution curve. In the system, there is a plurality of optical elements configured to create an optical image at one or more image planes in which the one or more image sensors 615 are located. The case when there is more than one image plane and more than one imaging sensor could be for example, but not limited to, a system in which the red, the green and the blue colors are separated in the system to be imaged on multiple sensors. The plurality of optical elements includes at least one movable freeform element. In some embodiments, the optical system includes an image sensor located at the image plane and the image sensor is configured to convert the optical image created by the plurality of optical elements into a digital image. The image sensor transforms the optical image to a digital image by reading and converting the pixels from the image sensor. Here, the image sensor can be of any kind, including a CMOS or CCD creating a monochromatic or polychromatic image, but can also be any other kind of sensor creating some sort of data from focused rays of light in an image plane of the optical system like a lidar using a single-photon avalanche diode, avalanche photodiode array or any other type of lidar sensor, a time of flight or any other type of depth sensor, a temperature sensor or any other kind of electronic sensor converting the input light to a digital image, either inside a digital image file recorded with any file format (JPG, BMP, TIF, PNG, GIF or any other digital image file format) or a digital image inside a memory buffer. The input light can be of any kind and from any part of the spectrum, including, but not limited to, visible light, ultraviolet light, infrared light, polarized light, light from a laser source, light from diffractive elements or the likes. With any of these applications, the term distorted optical image created by the optical system must be understood in this patent to comprise any kind of optical image formed by the convergence of ray of light in an image plane, including, but in no way limited to, a monochromatic or polychromatic images, temperature image, depth images, multispectral information images. Same for the corresponding digital image file from the image sensor, it must be understood in this patent to comprise any kind of digital image file resulting from the above-mentioned types of optical image or types of image sensors and is not restricted to any kind of image.

The digital image file or memory buffer is linked to a processor 670 via a link 660. The processor 670 is any hardware able to analyze and process a digital image file, including a central processing unit (CPU), a graphical processing unit (GPU), an application-specific integrated circuit (ASIC), a field programmable gate array (FPGA) or any other hardware capable to process the digital image file. The processor 670 can be located inside the lens system, inside the camera, or inside the device in which the camera is located, like a smartphone or a computer. Alternatively, the processor could also be part of a separate device and the information for the controller can be transmitted via any communication link, including wireless, via the Internet or the like. In some embodiments according to the present invention, the processor is configured to process the digital image. When doing so, this processor 670 is configured to analyze and process the digital image from the optical system and can interpret automatically how the resolution curve should be modified in order to improve the digital image file received from the image sensor 615. The processor can then instruct the controller to cause the at least one actuator to move the at least one movable freeform element to a different position by transmitting the information to the controller 650 via a link 680. The link 680 is any way to transfer information from a device to another, including a physical cable, over the air, via the Internet or the like. The controller then updates the position of the freeform elements 620 and 625 with the actuators 630 and 635 so that the optical system is in a new configuration. After the position of the freeform elements is adjusted, the next image captured by the image sensor 615 has the new required resolution curve requested by the processor 670. These iterative steps can continue in real-time to change continuously the resolution curve depending on the application and the analyzed content of the digital image file, either in a closed-loop or an open-loop optimization process.

In some embodiments according to the present invention, the processor 670 can also process the received digital image file in order to either display it to a human observer or to send it to a further algorithm unit that is using the output image such as, but not limited to, any computer vision algorithm, any artificial intelligence algorithm, any machine learning algorithm, any depth calculation algorithm (including from stereo image, structured light analysis or from time of flight sensors), any further image processing or image enhancement algorithm or any other algorithm that can use the output from the optical system. This further step of processing of the digital image could include at least partial image dewarping in order to at least partially correct the non-linear distortion in the image resulting from the adaptable resolution curve. Here, dewarping is understood to mean any correction, modification, processing or transformation of the optical distortion in a digital image. This image dewarping step is possible when the processor 670 knows the distribution function or the resolution curve of the optical system at the time the digital image file is captured. With calibration or with a lookup table, the processor 670 can know the exact distortion profile for each position of the freeform surfaces and can optimally process the images. In addition to processing the image distortion, this processing step could also include any other kind of image processing algorithm, including correction of other aberrations in the optical systems like the ones that vary dynamically with the position of the freeform surfaces. When the processor 670 instructs the controller 650 of a given configuration, the information about the distribution function or the resolution curve can be selected from a lookup table, a polynomial function with adjusted coefficients or any other way to store the information. Alternatively, when the controller 650 is configured from an external source other than the processor 670 to place the freeform elements in a given position to create a specific distribution function and resolution curve, the controller 650 can send the information about the distribution function or the information about the freeform position to the processor. Alternatively, the camera of the optical system could also write this information in a marker or a watermark visible or not inside the digital image file or in a meta-data of the digital image file.

The example optical system presented at FIG. 6 can also be used in a more general method to create distorted images having dynamically adapting non-linear resolution curves. The method includes the steps of first creating an optical image in an image plane of the plurality of optical elements, the optical image having a total field of view and then causing, by the controller, the at least one actuator to move the at least one movable freeform element. With this method, when the at least one movable freeform element is in a first position, the optical image has a first resolution curve and when the at least one movable freeform element is in a second position, the optical image has a second resolution curve. In this method, the first resolution curve is different than the second resolution curve.

FIG. 7 shows multiple examples of configurations of the at least one freeform element. These are just some examples to better understand the possibilities, in no way limiting the scope of the present invention to the shown examples. At FIG. 7A, the configuration with two freeform elements 700 and 705, each having a plano surface and a freeform surface, the two plano surfaces facing each other, is shown. At FIG. 7B, the configuration with a single freeform element 710 having one freeform surface and one plano surface is shown. At FIG. 7C, the configuration with a single freeform element 720 having two freeform surfaces is shown. At FIG. 7D, the configuration with two freeform elements 730 and 735, each having a freeform surface and a non-freeform surface is shown. The non-freeform surface could be of any shape, including spherical, aspherical or the like. At FIG. 7E, the configuration with two freeform elements 740 and 745, each having a plano surface and a freeform surface, the two freeform surfaces facing each other, is shown. At FIG. 7F, the configuration with two freeform elements 750 and 760, each having a plano surface and a freeform surface, with at least one other optical element located between the movable freeform elements represented by the element 755, is shown. This at least one other optical element located between the movable freeform elements could be of any shape, including plano, spherical, aspherical, cylindrical, freeform or any other shape.

In some other embodiments of the present invention, the translation of the freeform elements in the Y direction to control the resolution curve of the optical system could be combined with translation in the X or Z directions or rotation around any axis of at least one of the freeform optical elements for better control on the lens performance (6 degrees of freedom), including keeping or changing the lens total field of view or improving the image quality by increasing the resulting image modulation transfer function (MTF). In some other embodiments, there could also be at least one more movable optical surface in the optical system, whether a freeform element or an element with rotational symmetry, that could be moved in either the X, Y or Z direction in order to better control the image quality, resolution curve or any other optical performance of the system. This can also be combined with a translation of the image sensor, including an auto-focus system, in order to maximize the image quality in any region desired for a given configuration of the freeform elements.

In some embodiments of the present invention, the aperture stop could include an adjustable IRIS that can be controlled electronically. By changing the size of the aperture depending on the configuration of the freeform optical elements, a better control of the aberrations is possible. For example, in no way limiting the scope of the present invention, the aperture stop diameter could be smaller when the freeform elements are in an off-centered position relative to the optical axis and larger when the freeform elements are centered around the optical axis.

In all of the embodiments according to the method of the present invention, the resolution curves in either the X or the Y direction can be symmetrical or not around the value at the center of the field of view, depending on the shape of the freeform elements.

In all of the embodiments according to the method of the present invention, the movable freeform surfaces can have an optical coating applied to them. This coating can vary across the optical surface, allowing to change the optical properties of the systems when moving at least one freeform surface since the part of the surface across the light path has a variable optical coating offering variable performances.

In other embodiments of the present invention, the optical system is a projection system projecting an image outside of the optical system instead of an imaging system creating an optical image on an image sensor of the optical system. In that case, an alternate distribution function and an alternate resolution curve can be defined, this time linking the angular position of the image to the height of the source point on the projecting object. In that projection case instead of imaging case, the method to adjust the resolution curve by moving freeform optical elements according to the present invention remains the same. In this kind of system, the object is the display source for creating the projection and the optical image is created by the projected rays in the scene around the optical system. In this projection case, the image plane might be different for each field angle. For example, each object in the scene around the optical system receiving a ray of light from the projection system may define a separate image plane. In such a case, the optical image may be distributed across the optical image planes in the scene. This way, the projection system can adjust the distortion of the system to match the display shape in real-time even if the display shape change in time or accommodate the size and resolution of the displayed object depending on the application scenario. For example, the system according to the present invention could be used in a projection system for an automotive application in which the projection system with dynamic distortion could be used for example to project signs on the road of different size or light intensity that vary according to the application. It could also be used to project a light source in a time-of-flight system or a structured light system. By changing the projection distortion dynamically, the system could be used to increase the amount of light or resolution of the target in a specific zone of interest, allowing to improve the calculation of distance to a target in front of the automotive vehicle based on the detected targets. The system could run in an open-loop or closed-loop to improve the performance on a zone of interest based or not on feedback from an algorithm unit.

In other embodiments according to the present invention, instead of only translation of the freeform elements, the actuators could move the freeform elements in a purely rotational movement around any axis, including tilt movement of the freeform elements. More generally, the actuators can move the freeform elements in any combination of rotation around any axis, any tilt and any translation in any direction. According to the present invention, the freeform elements can move with 6 degrees of freedom in the optical system as needed.

In other embodiments according to the present invention, the optical system is used to capture at least a first image with higher resolution in a first region of interest and a second image with higher resolution in a second region on interest, the second region of interest being different than the first region of interest. The at least two images with higher resolution in their respective zone of interest are then combined into a single image by a hardware or software image processing algorithm to create a combined image having higher resolution in the at least two zones of interest by using the image with the highest resolution in each zone of the combined image.

In other embodiments according to the present invention, the optical system with dynamic distortion is running in a loop with the processor analyzing the resulting digital image. In that case, it is the processor that instructs the controller of a new position for the movable freeform element after processing of the digital image. For example, the optical system could be used in a device that automatically optimizes the distortion profile of the optics in order to maximize the ability to recognize an object in the scene or any other kind of information the algorithm requires. The algorithm could work on maximizing any parameter, for example the confidence level of a deep learning artificial intelligence algorithm recognizing an object in the scene. The processor would then instruct the controller to move the movables freeform elements until the best configuration is achieved for the desired output, similar to what an autofocus trying to maximize the focus of a camera does but this time optimizing on the distortion instead of the focus position.

In a preferred embodiment of the current invention, the total field of view of the optical image is kept the same when the resolution curve is changed. More precisely, for at least two positions of the at least one movable freeform element, the total field of view of the optical image when the at least one movable freeform element is in the first position is the same as the total field of view of the optical image when the at least one movable freeform element is in the second position. In other embodiments, in addition to changing the resolution curve, the total field of view of the optical image could be changed by the move of at least one freeform optical element.

There are multiple examples of applications for such an optical system with dynamic optical distortion. In the consumer electronics industry, including for mobile phones, tablet, computers or other small electronics, the use of dynamic distortion allows to replace with a single optical system what would require either multiple cameras to image each zone of interest of the field of view with equal resolution or either a larger image sensor which increases the size and cost of the systems and is not desirable especially in consumer electronics applications. By using freeform surfaces that move in the transverse direction instead of the longitudinal direction, this allows reducing the size of the system even more, allowing to fit even in the thinnest of the consumer electronics devices like thin mobile phones. In security or automotive applications, having a dynamic distortion allowing to create a zone of interest with increased number of pixels in real-time is useful to better inspect objects seen in that zone, whether it is an intruder seen by a security camera or an obstacle on the road ahead in an automotive camera. Again, by using a single optical system with dynamic distortion, the system according to the present invention allows to either replace multiple cameras with a single camera or to use an image sensor with a lower total number of pixels. This allows either to reduce the size and cost by using smaller overall systems when a lower number of total pixels is required or to increase the low-light sensitivity of the optical systems by using larger pixels on the image sensor since again a less overall number of pixels is required. Other applications for an optical system designed according to the method of the present invention includes industrial applications, aerospace, medical or any other application that can benefit from a system with dynamic optical distortion in a compact form factor. One other example of application of an optical system with dynamic distortion could be in machine perception and robotics, for example in a system to mimic different types of bioinspired vision systems. One example is a human eye that is able to adapt the vision to see larger objects when needed, farther objects when needed or to direct the zone of higher resolution to the direction of the gaze. Such types of optical systems with dynamic distortion using freeform elements can be used to replicate for example human vision systems for certain applications such as AR/VR/MR headsets. In other machine perception application, other bio inspired vision systems can be designed to expand the machine perception capabilities beyond human vision and perception.

All of the above figures and examples show the method to adjust the distribution function and its related resolution curve by using at least one movable freeform element and at least two freeform elements in a preferred embodiment. These examples are not intended to be an exhaustive list or to limit the scope and spirit of the present invention. It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. An optical system to create distorted images having dynamically adapting non-linear resolution curves, the optical system comprising:

a. a plurality of optical elements configured to create an optical image at one or more image planes, the optical image having a total field of view, the plurality of optical elements including at least one movable freeform element;

b. at least one actuator configured to move the at least one movable freeform element between at least a first position and a second position different from the first position;

c. a controller configured to control the at least one actuator, wherein when the at least one movable freeform element is in the first position, the optical image created by the plurality of optical elements has a first resolution curve and when the at least one movable freeform element is in the second position, the optical image created by the plurality of optical elements has a second resolution curve, the first resolution curve being different than the second resolution curve.

2. The optical system of claim 1, further comprising an image sensor located at the image plane, the image sensor being configured to convert the optical image created by the plurality of optical elements into a digital image.

3. The optical system of claim 2, further comprising a processor configured to process the digital image.

4. The optical system of claim 3, wherein the processing of the digital image includes at least partially dewarping the digital image.

5. The optical system of claim 3, wherein the processor is configured to, after processing of the digital image, instruct the controller to cause the at least one actuator to move the at least one movable freeform element to a different position.

6. The optical system of claim 1, comprising two movable freeform elements.

7. The optical system of claim 1, wherein the total field of view is greater than 80°.

8. The optical system of claim 1, wherein the total field of view of the optical image when the at least one movable freeform element is in the first position is the same as the total field of view of the optical image when the at least one movable freeform element is in the second position.

9. The optical system of claim 1 having a total track length, the total track length being less than 10 mm.

10. The optical system of claim 1, wherein a resolution value for at least one field angle in the total field of view varies by at least ±10% between the first resolution curve and the second resolution curve.

11. The optical system of claim 1, wherein the optical image created by the plurality of optical elements is at least one of a monochromatic image, a polychromatic image, a temperature image, a depth image, or a multispectral information image.

12. The optical system of claim 1, wherein the plurality of optical elements are configured to accept input light in a visible range.

13. A method to create, by an optical system, distorted images having dynamically adapting non-linear resolution curves, the optical system comprising a plurality of optical elements having a total field of view and including at least one movable freeform element, at least one actuator for moving the at least one movable freeform element, and a controller, the method comprising:

a. creating, by the plurality of optical elements, an optical image in one or more image planes, the optical image having a total field of view; and b. causing, by the controller, the at least one actuator to move the at least one movable freeform element, wherein when the at least one movable freeform element is in a first position, the optical image has a first resolution curve and when the at least one movable freeform element is in a second position, the optical image has a second resolution curve, the first resolution curve being different than the second resolution curve.

14. The method of claim 13, wherein the optical system further comprises an image sensor located at the image plane, the method further comprising converting, by the image sensor, the optical image into a digital image.

15. The method of claim 14, wherein the optical system further comprises a processor, the method further comprising processing, by the processor, the digital image.

16. The method of claim 15, wherein the processing of the digital image includes at least partially dewarping the digital image.

17. The method of claim 15, further comprising instructing, by the processor after processing the digital image, the controller to cause the at least one actuator to move the at least one movable freeform element to a different position.

18. The method of claim 13, wherein the optical system comprises two movable freeform elements.

19. The method of claim 13, wherein the total field of view is greater than 80°.

20. The method of claim 13, wherein the total field of view of the optical image when the at least one movable freeform element is in the first position is the same as the total field of view of the optical image when the at least one movable freeform element is in the second position.

21. The method of claim 13, wherein the optical system has a total track length, the total track length being less than 10 mm.

22. The method of claim 13, wherein a resolution value for at least one field angle in the total field of view varies by at least ±10% between the first resolution curve and the second resolution curve.

23. The method of claim 13, wherein the optical image created by the plurality of optical elements is at least one of a monochromatic image, a polychromatic image, a temperature image, a depth image, or a multispectral information image.

24. The method of claim 13, wherein the plurality of optical elements are configured to accept input light in a visible range.

* * * * *